United States Patent [19]
Pages

[11] 3,787,814
[45] Jan. 22, 1974

[54] LOGIC SYSTEM FOR THE PROCESSING OF DATA DELIVERED BY NUCLEAR DETECTORS

[75] Inventor: Roland Pages, New York, N.Y.

[73] Assignee: Schlumberger Instruments et Systemes, Paris, France

[22] Filed: June 22, 1971

[21] Appl. No.: 155,548

[30] Foreign Application Priority Data
June 23, 1970 France .............................. 7023118

[52] U.S. Cl. ............................................ 340/172.5
[51] Int. Cl. ............................................ G06f 7/00
[58] Field of Search.................. 340/172.5; 235/157

[56] References Cited

UNITED STATES PATENTS

| | | | |
|---|---|---|---|
| 3,513,448 | 5/1970 | Armstrong | 340/172.5 |
| 3,546,684 | 12/1970 | Maxwell et al. | 340/172.5 |
| 3,462,743 | 8/1969 | Milewski | 340/172.5 |
| 3,581,286 | 5/1971 | Beausoleil | 340/172.5 |
| 3,345,616 | 10/1967 | Avril et al. | 340/172.5 |

*Primary Examiner*—Paul J. Henon
*Assistant Examiner*—Mark Edward Nusbaum
*Attorney, Agent, or Firm*—William R. Sherman et al.

[57] ABSTRACT

A logic system for processing data derived from a multiplicity of individual detectors for the purpose of detecting the presence of data generated by at least one of said detectors and for the purpose of identifying the detectors which have generated data. The disclosed logic system is particularly suited for use with nuclear detectors designed to detect the existence of particles with very short life times which could be of the order of a nanosecond. The disclosed embodiment comprises a first pyramidal multilevel matrix of OR circuits and a second pyramidal multilevel matrix of switching circuits, with the two matrices being symmetrical, and with the first matrix serving primarily to detect the presence of data generated by a detector and the second matrix serving primarily to identify the detectors which have generated data.

12 Claims, 10 Drawing Figures

INVENTOR.
Roland Pages

BY

ATTORNEY

CY1

CZ1

FIG. 7 CTZ

FIG. 8
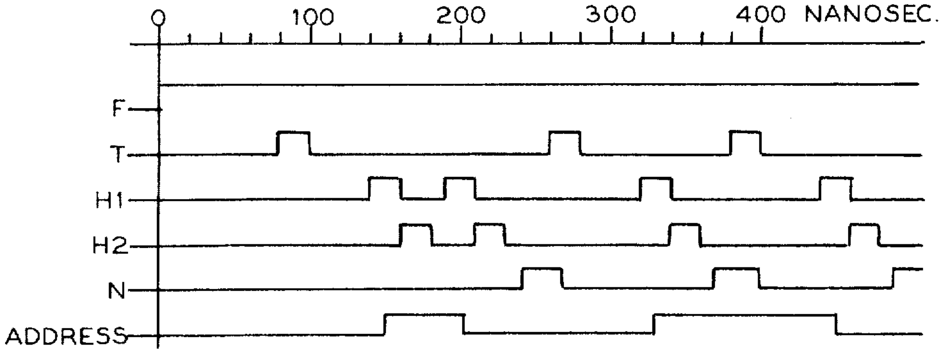
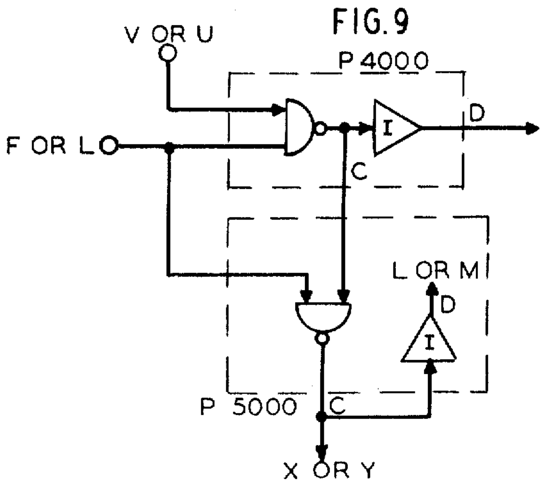
FIG. 10
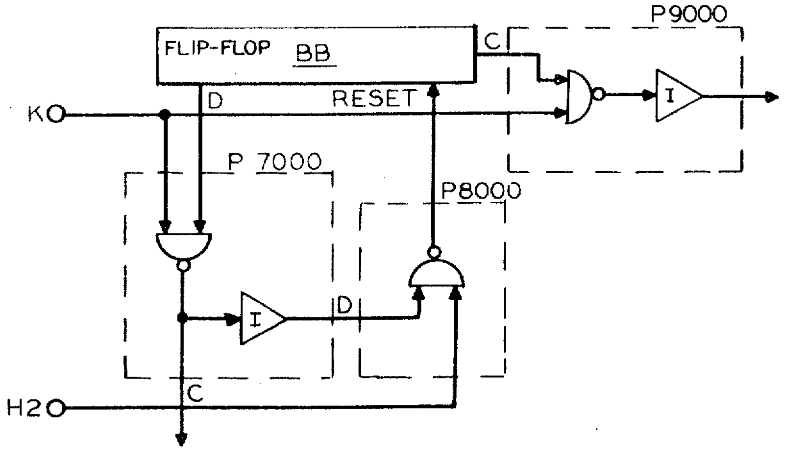

LOGIC SYSTEM FOR THE PROCESSING OF DATA DELIVERED BY NUCLEAR DETECTORS

BACKGROUND OF THE INVENTION

This invention relates to logic systems for the processing of data furnished by nuclear detectors, in particular multiple proportional chambers, called wire chambers.

In high and low-energy nuclear physics research, use is made of detection devices known as wire chambers designed to reveal, during experiments, the existence of particles with very short lifetimes, which can be of the order of a nanosecond.

It is thus important, for the researcher, that the data acquisition and availability times be as short as possible so as not to lose, and to be able to process, the other events which may subsequently occur during the same experiment.

This implies that the electronics associated with these chambers should allow use to be made of all their intrinsic properties, while remaining relatively simple so that the cost of devices having thousands of wires does not become prohibitive.

A known method of processing data furnished by nuclear detectors each controlling the state of a memory flip-flop is to group the outputs of the memory flip-flops on several OR circuits which form the base of a pyramid of OR circuits at the apex of which appears a logic signal when an event has been detected by at least one of the detectors. This signal then triggers a scanning process in order to determine the address of the flip-flop(s) having changed state. To accomplish this, each memory flip-flop is provided with an associated couple of gate circuits which form the base of a pyramid of gate circuits the other levels of which are controlled by the corresponding levels of the pyramid of OR circuits. An interrogation signal is applied to the first couple of gate circuits of the apex of the pyramid. If the output of the corresponding OR circuit is in the 0 state, the interrogation signal is applied to the following couple; when the said signal reaches a couple of gate circuits of which the corresponding OR circuit has its output in the 1 state, a branching channel is established for this signal towards the following output level of the pyramid where the same scanning process takes place. Thus, by descending the pyramid, one reaches the group of memory flip-flops at least one of which has changed state, finally allowing, during the scanning of this group, the determination of the address of this flip-flop.

While this solution is satisfactory in the case of a relatively small number of detectors, it has a serious disadvantage when this number is large. In fact, the number of gate circuit couples at the base of the pyramid must be equal to the number of detectors; it can be easily seen that the cost of such an arrangement quickly becomes prohibitive.

SUMMARY OF THE INVENTION

The present invention proposes a processing system overcoming the disadvantages of the prior art system discussed above.

More precisely stated, an object of the invention is to provide a logic system for the processing of data delivered by nuclear detectors, of the type including:

a plurality of memory flip-flops each associated with one of said detectors and each having its state modified by the presence of data delivered by the associated detector, a first pyramidal-structure matrix of OR circuits each input of which is connected to the output of a memory flip-flop, a second pyramidal-structure matrix of switching circuits each composed of a series of gate circuit couples, interconnected so that in the absence of an input signal, a scanning signal is transmitted to the following couple and, in the presence of an input signal, the latter blocks one of the gate circuits thereby producing, on the one hand, the opening of a branching channel for the said scanning signal towards a switching circuit of the output level of the said second matrix and, on the other hand, the storage of the address of the said couple in a register, the number of switching circuits and the number of OR circuits of the two pyramids being identical for corresponding levels, with each OR circuit being associated a switching circuit, the number of gate circuit couples in each switching circuit being equal to the number of inputs of the associated OR circuit, the outputs of the OR circuits connected to the inputs of a given OR circuit of the input level being connected to the inputs of the switching circuit associated with this OR circuit to furnish the input signals of each of its gate circuit couples, the outputs of which constitute the branching channels for the application of the scanning signal to an output level switching circuit, said system being distinguished by the fact that it also includes:

a plurality of AND gates each connected to the output of a memory flip-flop in a number of groups equal to the number of OR gates of the lowest level of the first pyramid, the AND gates of a given group being made to conduct by a scanning signal coming from a gate circuit couple of the lowest level of the second pyramid, OR gates, in a number equal to the number of OR circuits of the lowest level of the first pyramid, the output of the corresponding AND circuit of each group being connected to the input of each of these OR gates, and a buffer memory composed of flip-flops each connected to the output of one of the said OR gates, the address of the flip-flop undergoing a change of state being stored in a register.

Thus, in the processing system according to the invention, one proceeds with a transfer to a buffer memory of the contents of the memory flip-flops belonging to the group in which an event has been recorded and it is the state of this memory which furnishes the sought address. In this manner, one obviates the need to assign a gate circuit couple to each flip-flop.

For a better understanding of the invention together with further objects and advantages thereof, reference is had to the following description taken in connection with the accompanying drawings representing a preferred embodiment of the system according to the invention.

BRIEF DESCRIPTION OF THE DRAWINGS

FIG. 8 is a diagram representing different reading signals as a function of time; and FIGS. 9 and 10 show embodiment examples of switching circuits.

DETAILED DESCRIPTION

To facilitate the description of the invention, it will be assumed that the detector delivering the data to be processed is a 512-wire chamber, but it goes without saying that the invention is not limited to this number and that it is applicable to a detector grouping any number whatsoever of elementary detectors.

Figure 1:
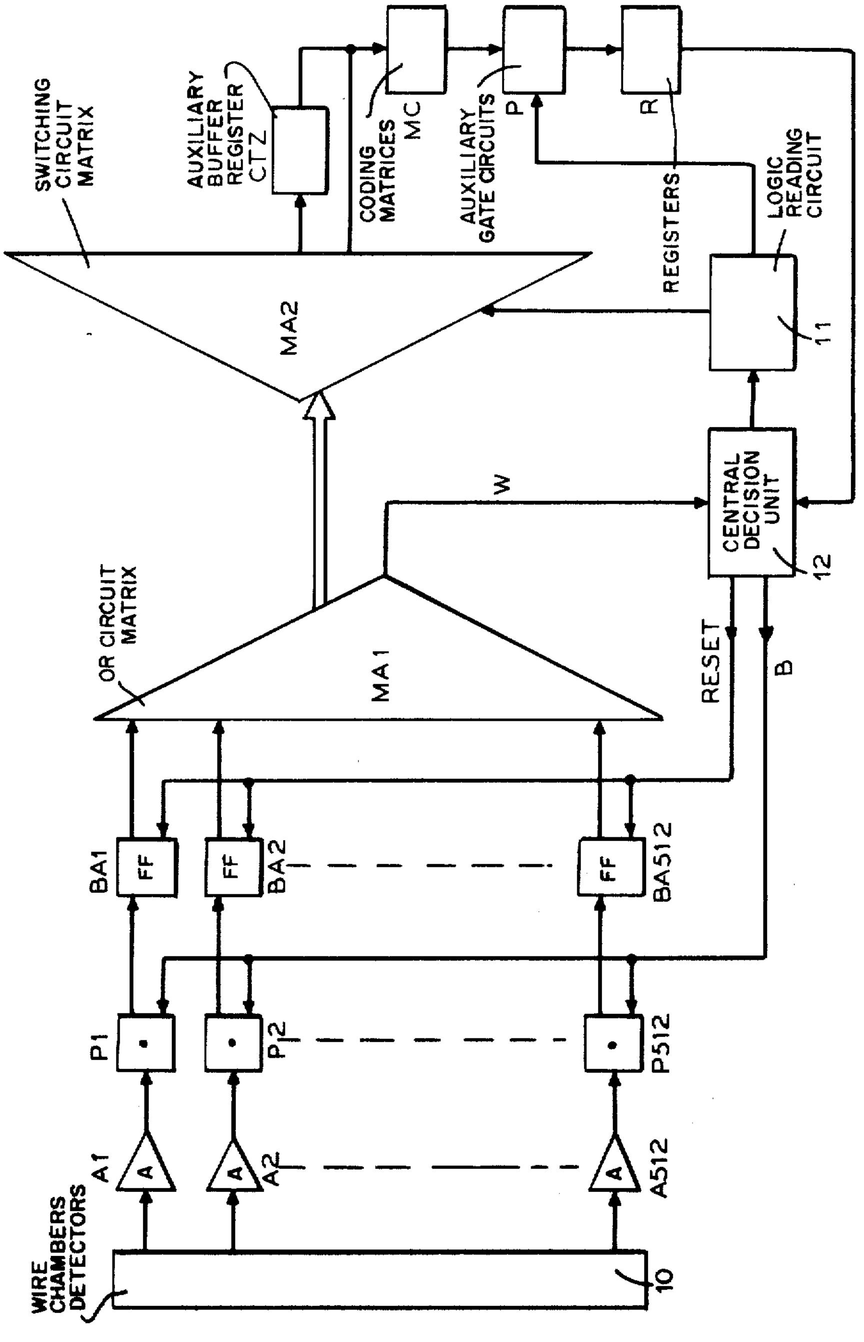
FIG. 1 is the block diagram of a system and including an OR circuit matrix, a switching circuit matrix and a buffer memory.
Figure 2:
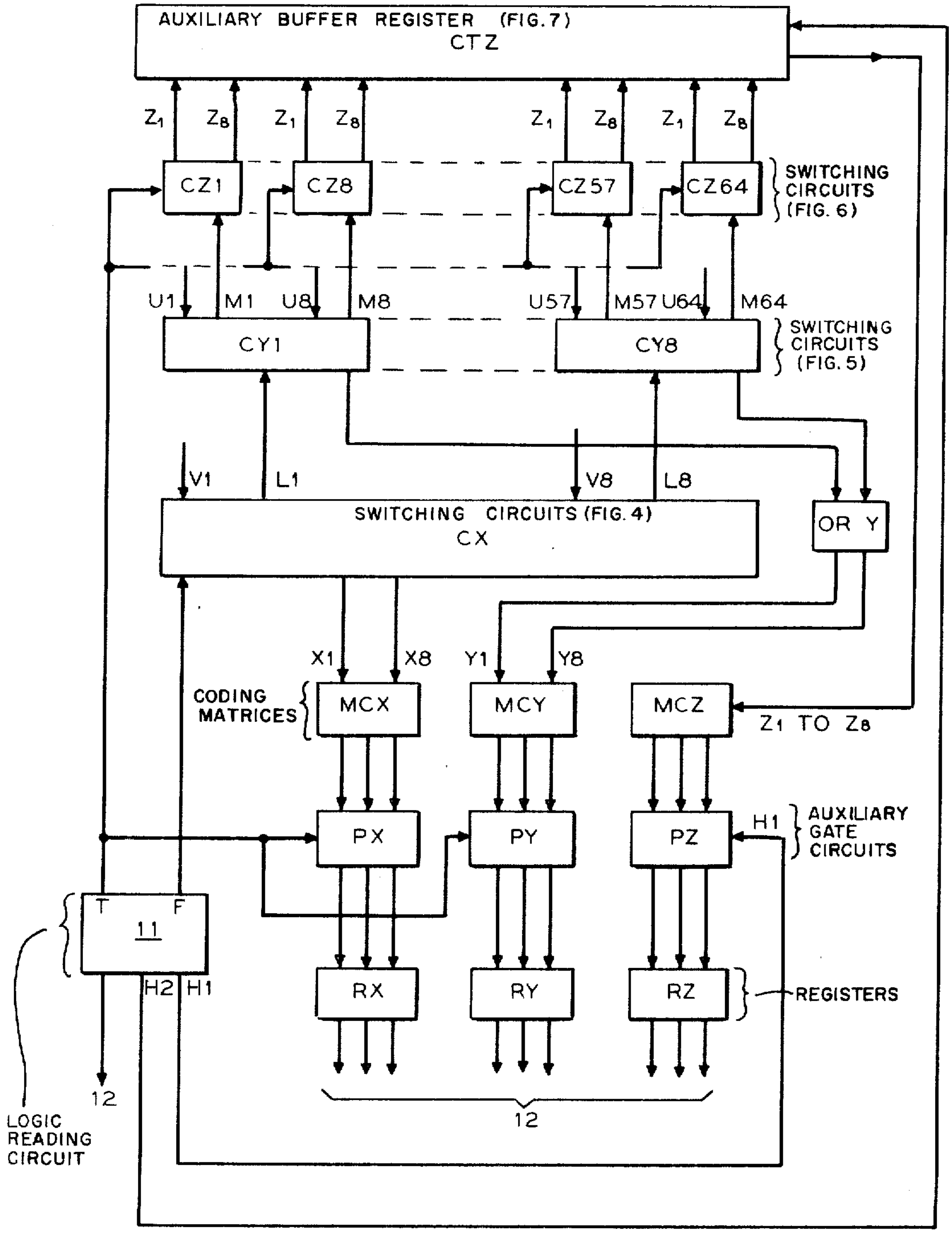
FIG. 2 is a corresponding functional diagram.

Referring now to FIGS. 1 and 2, BA1 to BA512 designate the flip-flops playing the role of a temporary memory respectively connected to each wire of a wire chamber 10 via an amplifier A1 to A512, followed by a gate circuit P1 to P512 composed of a two-input AND circuit. The outputs of these flip-flops are connected via a pyramidal structure OR circuit matrix $MA_1$ the connection of which will be pointed out further below, and which furnishes a signal W at its output. With this matrix $MA_1$ is associated a switching matrix $MA_2$ which is designed to detect, in the reading phase, under the control of logic reading circuits 11, the flip-flops which have changed state during the experiment. The address of these flip-flops is obtained at the end of a scanning by reading circuits in registers R connected to the matrix $MA_2$ through coding matrices MC and auxiliary gate circuits P controlled by the reading circuits 11. 12 is the central decision unit controlling the system. CTZ designates an auxiliary buffer register.

An acquisition phase takes place in the following manner: it is assumed that the central unit 12 has given the order for unblocking the gate circuits P1 to P512 and that the flip-flops BA have been reset. The experiment may then be triggered in the chamber. When a wire is influenced, the pulse picked up at its output is amplified by the amplifier A*i* and applied via the corresponding gate circuit P*i* to the associated flip-flop BA*i* which then changes state. The resulting pulse goes through the matrix $MA_1$ which, at its output, delivers a signal W = 1. This signal, meaning "event recorded", is applied to the central unit 12 which emits the order B producing the blocking of the gate circuits P1 to P512 and isolating the flip-flops BA1 to BA512 from the input side of the system to make them available in the consecutive reading phase.

For the reading operation, the invention takes advantage of the internal connections of the OR circuit matrix $MA_1$ to group and subgroup in blocks the addresses of the different memory flip-flops BA associated with the wires of the chamber 10 and to successively scan them in blocks. In the considered example of a 512-wire chamber, the 512 addresses are grouped first in eight blocks, having coordinates X1 to X8, of 64 addresses. Each block X is then subgrouped in eight blocks, having coordinates Y1 to Y8, of eight addresses. Finally, each wire of a block Y has its own address Z, from Z1 to Z8.

Figure 3:
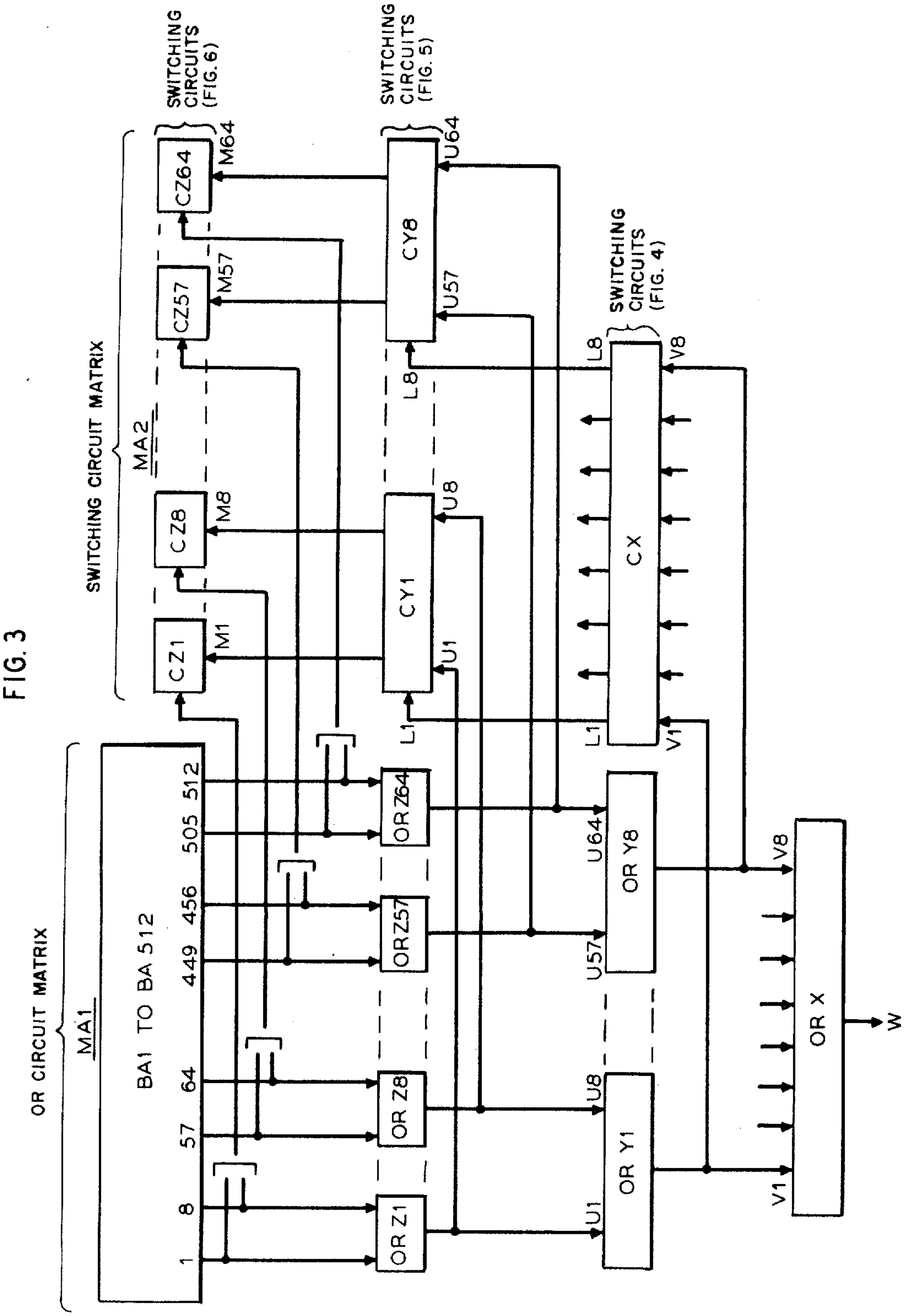
FIG. 3 shows the interconnection diagram of the two matrices.

FIG. 3 shows in greater detail how the matrices $MA_1$ and $MA_2$ are interconnected. The matrix $MA_1$ is composed as follows: on the output side, the 512 outputs of the flip-flops BA1 to BA512 are grouped by eight, forming the inputs of 64 OR circuits, marked OR Z1 to OR Z64. Their outputs are again grouped by eight and connected to the eight inputs of eight new OR circuits marked OR Y1 to OR Y8. Finally, the eight outputs of these latter circuits are connected to the inputs of a single OR circuit OR X, on the input side.

U1 to U64 designate the output signals of 64 OR circuits OR Z, V1 to V8 the output signals of the eight OR circuits OR Y, and W the output signal of the circuit OR X.

Figure 4:
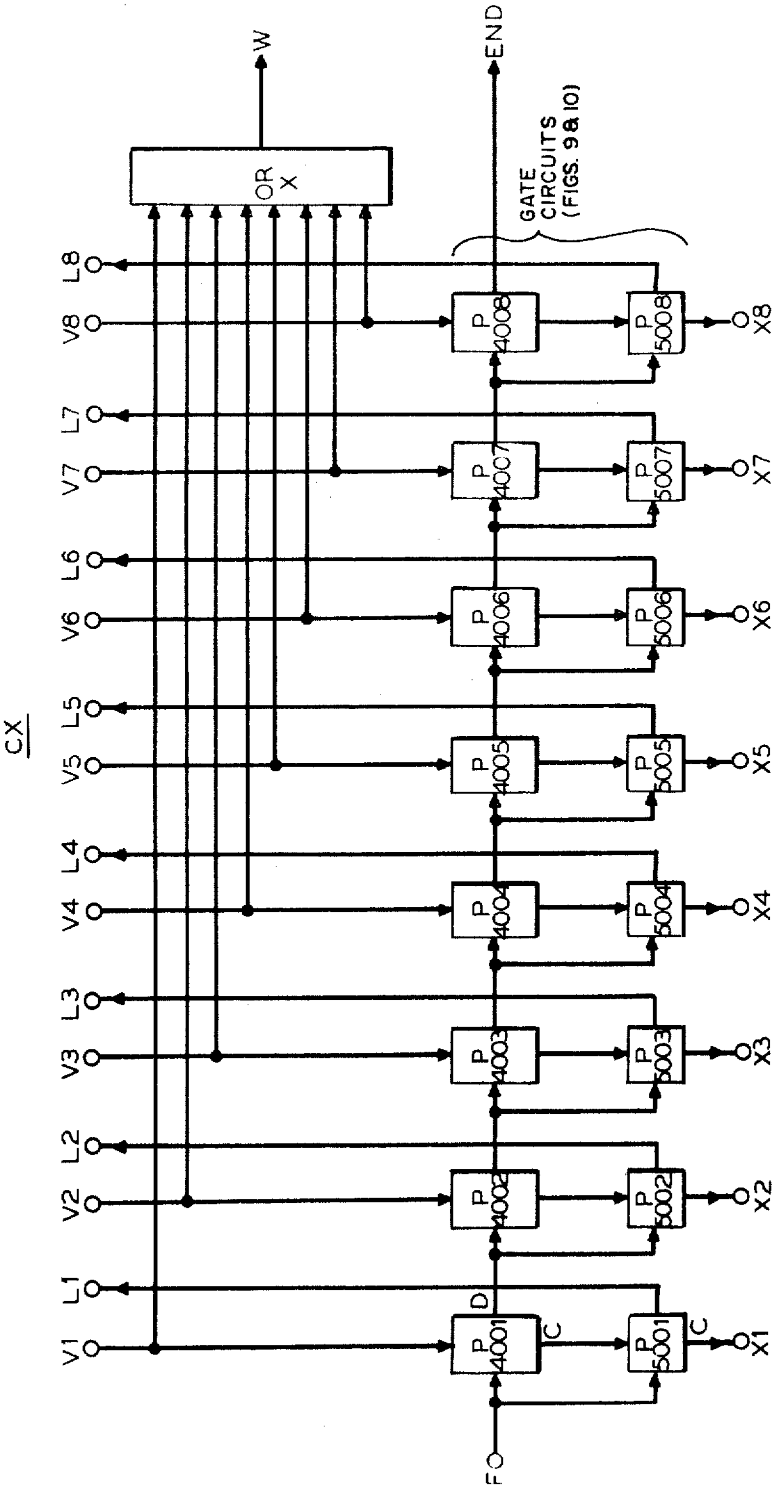
FIGS. 4 to 6 are diagrams of basic circuits constituting the switching matrix.

Similarly, the matrix $MA_2$ is composed, on the output side, of 64 circuits CZ1 to CZ64 (represented in greater detail in FIG. 6), of eight circuits CY1 to CY8 (shown in FIG. 5) and a circuit CX (shown in FIG. 4). The eight inputs of the circuit OR X of the matrix $MA_1$ are connected, at a corresponding level of the two matrices, to the circuit CX. Likewise, the input of the eight circuits OR Y1 to OR Y8 are respectively connected to circuits CY1 to CY8 and the inputs of the 64 circuits OR Z1 to OR Z64 are connected respectively to the circuits CZ1 to CZ64.

By L1 to L8 will be designated the signals issuing from the circuit CX which is applied respectively to the circuits CY1 to CY8 and by M1 to M64 the signals issuing from the eight circuits CY1 to CY8 which are applied to the corresponding circuits CZ1 to CZ64.

FIG. 2 represents a functional diagram of the reading system. In addition to the already-mentioned circuits of the matrix $MA_2$, it includes the auxiliary circuit CTZ, playing the role of a buffer memory associated with the circuits CZ, which circuit CTZ will be described in detail with reference to FIG. 7.

The data concerning the address X, Y, Z of a memory cell BA which has changed state during the acquisition phase are gathered in three registers RX, RY and RZ. The circuit CX is connected to the register RX via a coding matrix MCX and gate circuits PX. The circuits CY are connected to the associated register RY via a common circuit OR Y, the coding matrix MCY and gate circuits PY. Finally, CTZ is connected to the register RZ via a coding matrix MCZ and gate circuits PZ. The coding matrices convert the input information into corresponding coded signals, for example in binary code.

The gate circuits PX and PY are unblocked by a transfer signal T delivered by the logic reading circuits 11, whereas the circuits PZ are unblocked by a subsequent signal H1.

Assuming that a signal W = 1 has been obtained, the reading process, triggered by the central unit 12, begins by looking for the coordinate X of an occupied cell, i.e., a set flip-flop BA. A description will thus first be given of the circuit CX by means of which takes place the scanning of the groups of 64 flip-flops of the same coordinate X, and the direction of the first group containing an occupied cell.

Figure 5:
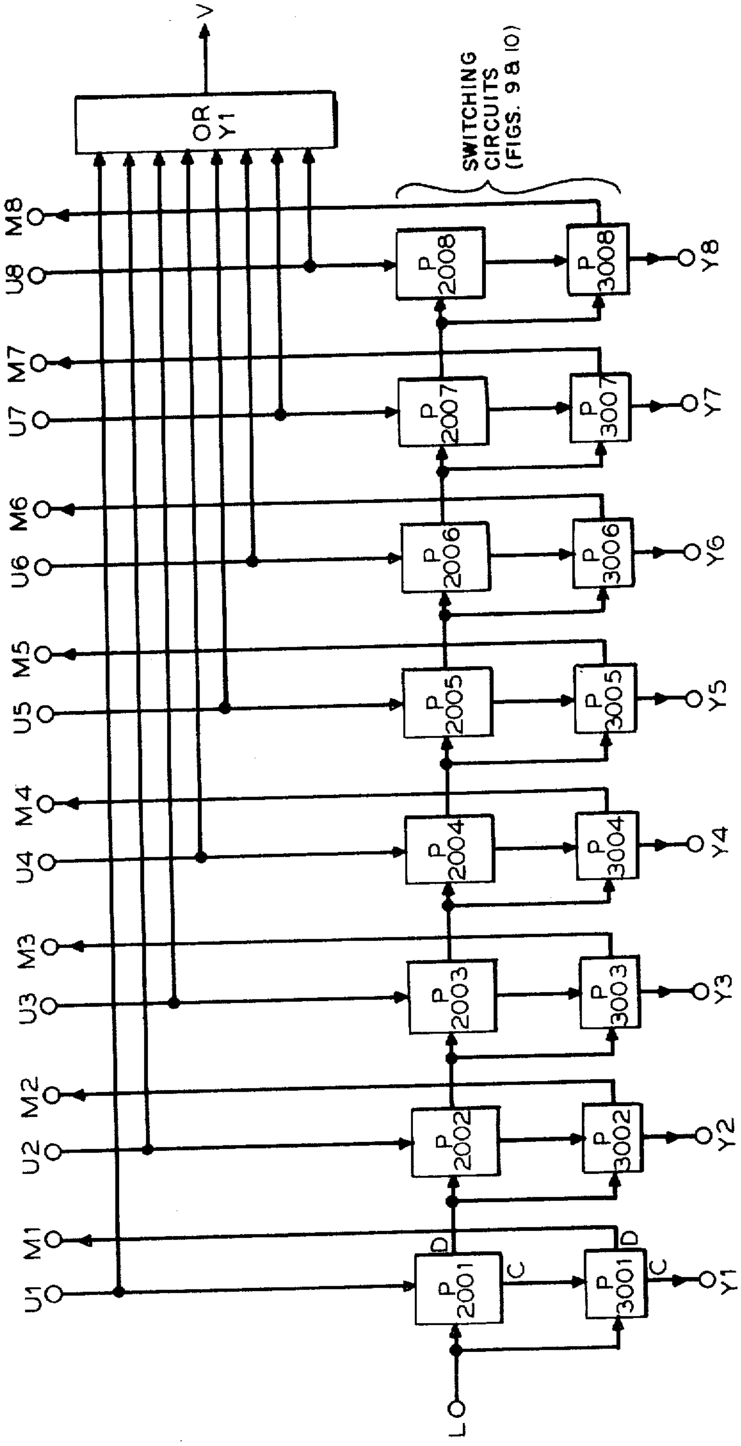

Referring to FIG. 4, we see that the signals V1 to V8 issuing from the circuits OR Y1 to OR Y8 (FIG. 3) are applied in parallel to the circuit OR X and to a group of eight switching circuits. Each of these circuits has two gate circuits such as P4001 and P5001, with two inputs and two outputs, one direct D, the other complementary C. These switching circuits are described in greater detail in FIG. 9. Each direct output of a circuit P4000 (except the last one) is connected to one of the inputs of the adjacent circuit P4000 according to the presence of a signal V = 1 on its input to thereby cause its blocking, while its output C causes the unblocking of the associated circuit P5000 of the same row. A reading signal F, delivered by the circuits 11, is applied in parallel to one of the inputs of the first circuits P4001 and P5001 in order to detect the row of the first blocked gate circuit P4000 and to obtain, on the outputs of the associated circuit P5000, the signals L and X of the row sought. The circuit P5000 thus opens a branching channel towards the output level of the matrix immediately underneath. The process is then pursued by searching the coordinate Y. For this purpose, the lines transmit the signals L1 to L8 leading respectively to the input of eight circuits CY1 to CY8. Such a circuit CY1, shown in FIG. 5, is composed as follows, like circuit CX: eight switching circuits to which are applied the signals U1 to U8, i.e. the input signals of the circuit OR Y1, each include two gate circuits P2000 and P3000, interconnected like the preceding circuits P4000 and P5000, and deliver, at their output, signals M and Y of corresponding rows. To these circuits is applied the signal L derived from the scanning of the circuit CX which replaces the preceding scanning signal F, until the detection of a circuit P2000 blocked by one of the signals U1 to U64, determining the searched coordinate Y.

Figure 6:
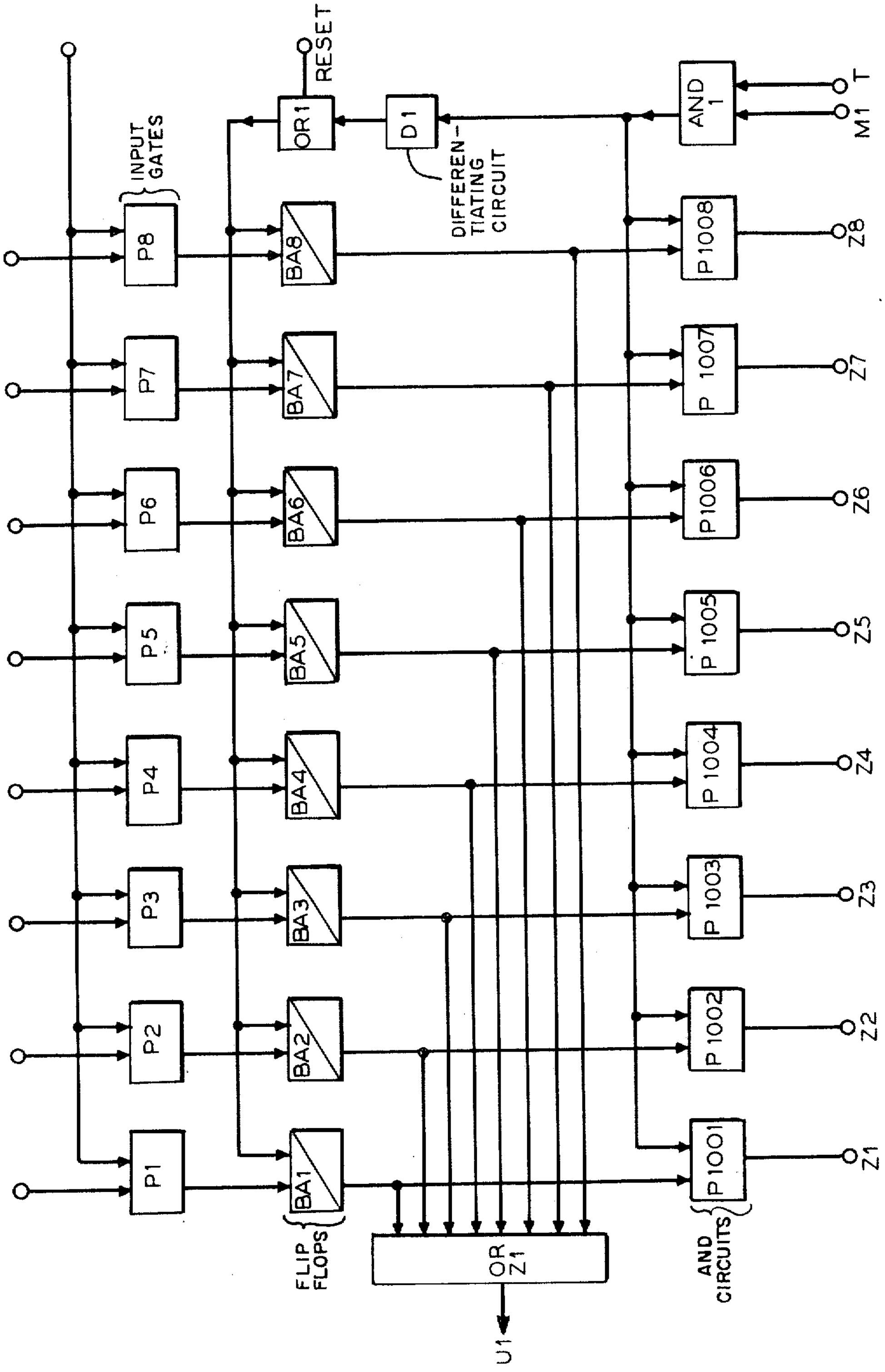
Figure 7:
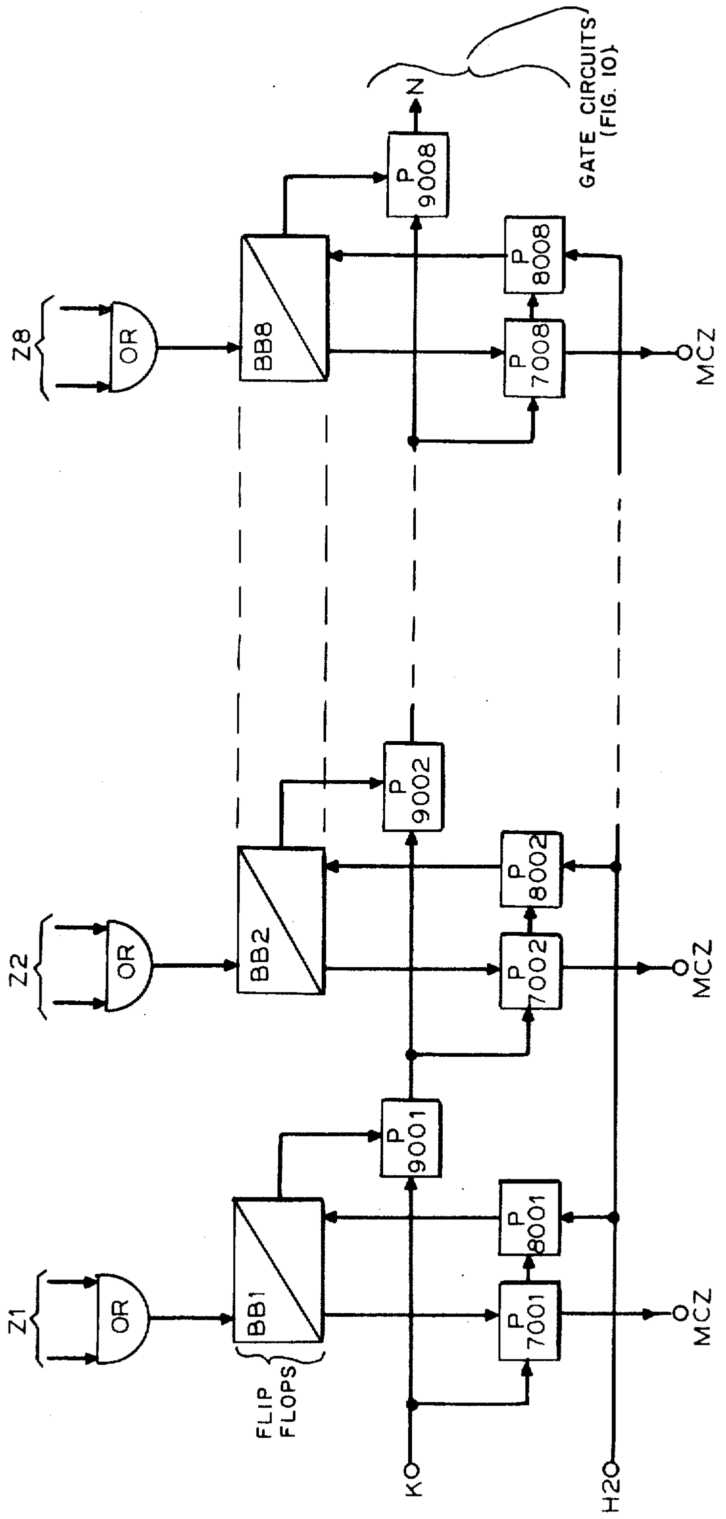
FIG. 7 represents the diagram of the buffer memory.

FIGS. 6 and 7 respectively represent the diagrams of one of the 64 circuits CZ, for example CZ1, and the buffer memory circuit CTZ which is connected thereto. The circuit CZ1 has,at its input, a circuit AND1 with two inputs receiving, in addition to the signal M1, the transfer signal T delivered by the reading circuits 11. The output of this circuit AND1 is connected, via a differentiating circuit D1 and an OR1 circuit, to the reset inputs of the memory flip-flops BA1 to BA8, the circuit OR1 receiving, on another input, a reset signal RESET. The output of the circuit AND1 is also connected to the two inputs of the AND circuits P1001 to P1008 the other input of which is connected to the output of the flip-flops BA1 to BA8. The outputs Z1 to Z8 of the circuits P1001 to P1008 are connected, via eight OR circuits (FIG. 7), to the inputs of the register of circuit CTZ which has eight flip-flops BB1 to BB8 destined to receive the contents of the flip-flops BA1 to BA8 after transfer. The outputs Z1 to Z8 of all the circuits CZ are also connected, via the same OR circuits, to the inputs of the circuit CTZ. The flip-flops BB1 to BB8 are interconnected by sets of gate circuits, such as P7001, P8001 and P9001, described in further detail in FIG. 10. P7001 is connected to the normal output of the flip-flop BB1 and P9001 to its complementary output. When the flip-flop BB1 is in the 1 state, it produces the unblocking of P7001 controlling the unblocking of P8001, and produces the blocking of P9001 which, in turn, produces the blocking of P7002 and P9002, and so on until P7008 and P9008. An enabling signal K is applied in parallel to the circuits P7001 and P9001. A reset signal H2 is sent, in relation to time with the signals T and H1 previously indicated, to the second input of the flip-flops BB1 to BB8, via the gate circuits P8001 to P8008.

The outputs of the gate circuits P7000 are connected to the register RZ in which appears the sought coordinate Z. A scanning end signal N appears at the output of the circuit P9008.

The operation of this system will now be described, assuming that, during the experiment, the two wires numbered 128 and 129 are the ones influenced, the resulting pulses having placed the flip-flops BA128 and BA129 in their 1 state. Under these conditions, we have:

U16 = 1 the other signals U all
U17 = 1 being at 0,
V2 = 1 the other signals V all
V3 = 1 being at 0, and, of course, W = 1 at the output of the matrix $MA_1$.

When the reading signal F is emitted (FIG. 4), it finds the circuit P4001 unblocked (V1 = 0). The direct output D transmits the signal to the circuit P4002, while its complementary output C blocks the circuit P5001. With V2 at 1, the circuit P4002 is blocked, P5002 is unblocked; the outputs X2 and L2 are thus made active. It is then to the circuit CY2 (similar to the circuit CY1 of FIG. 5) that the scanning signal L2 will now be applied. With U9 to U15 at zero, none of the lines M9 to M15 is made active, but finding U16 at 1, according to a process similar to the preceding one, the lines Y8 and M16 are, in turn, made active. By the expression "active line" is meant a line brought to a potential of logic level 1 or 0 capable of triggering an action on a receiver sensitive to this logic level potential.

When the circuits 11 emit the transfer signal T, the latter unblocks the circuits PX and PY, (FIG. 2) enabling the introduction of address data X = 2 and X = 8, coded the matrices MCX and MCY, into the respective registers RX and RY.

In the circuit CZ16, (similar to the circuit CZJ of FIG. 6) the signals T and M16 appear simultaneously on the circuit AND16, thereby unblocking the circuits P1121 to P1128, so that the contents of the corresponding flip-flops BA121 to BA128 are transferred to the flip-flops BB1 to BB8. The trailing edge of the signal T, differentiated by the circuit D16, then resets the flip-flops BA121 to BA128, after their contents are transferred. The result is that U16 and V2 come back to zero. Consequently, P4002 is unblocked and P5002 blocked, but V3 which is still at 1 still blocks P4003, and the lines X3 and L3 are active. L3 reaches the circuit CY3, and U17 blocks the circuit P2017 which unblocks P3017, making the lines Y1 and M17 active. Thus, by resetting the first flip-flop found in the 1 state, BA128 prepares the coding of the following address.

The flip-flop BB8 has passed to the 1 state. It unblocks P7008 which unblocks P8008, and it blocks P9008. The only circuits unblocked are thus the circuits P7008 and P8008. Consequently: referring to FIG. 2 a. by emitting the signal H1, the circuit PZ is unblocked and the coordinate Z of BA128 coded through the matrix MCZ is introduced into the register RZ. Then, the registers RX, RY and RZ contain the complete address of the first influenced wire, address code available to be sent to the central unit 12.

b. by emitting the signal H2, the latter goes through the circuit P8008, (FIG. 7) thereby resetting the flip-flop BB8, blocks the circuit P7008 which blocks the circuit P8008. The flip-flop BB8, at zero, unblocks P9008 thereby authorizing the output of the signal N indicating that all the flip-flops BB1 to BB8 of the register CTZ are at zero.

We then have the only flip-flop BA129 in the 1 state, U17, V3 and W in the 1 state, and hence L3, M17 active as we have seen, and the coded addresses X = 3 and Y = 1 at the inputs of the circuits PX and PY. By emitting another transfer order T, the addresses X and Y are introduced into their register RX and RY. Simultaneously, the contents of the flip-flop B129 are transferred into BB1 by the unblocking of the circuits AND17 and P1129 of the circuit CZ17. Then BA129 is reset after transfer, so that U17 and V3 also come back to zero, as does W. With V3 at zero, P4003 is unblocked, the END signal appears at the output of P4008, this meaning that the cell detected in BA129 was the last occupied cell of the memory.

By emitting another order H1, the coordinate Z = 1, coded in MCZ, is transferred into the register RZ through the circuit PZ. The new address is thus ready to be transmitted to the central unit 12.

By emitting the signal H2, the flip-flop BB1 is reset. The system is thus ready for a new acquisition phase since none of the other flip-flops BB2 to BB8 is in the 1 state, and the signal N appears, in turn, after the END signal.

We saw earlier that the signal W at the output of the matrix $MA_2$ produced the blocking of the input gates P1 to P512 of the 35-ns flip-flops BA1 to B512 after an event has taken place. From the moment the central unit triggers the reading process (emission of signal F), taken as the time origin $t$ (in ns), the diagram of the signals as a function of time is established as follows (FIG. 8):

from $t = 0$ to $t = 80$: a waiting period due to the transit time in the 16 gate circuits (5 ns per circuit) constituting the two circuits CX and CY scanned;

from $t = 80$ to $t = 100$: order for transferring the coded coordinates X and Y into their registers RX and RY;

from $t = 100$ to $t = 140$: new waiting period due to the transit time in the gate circuits P9000 of the circuit CZ concerned (5 ns × 8);

at $t = 140$: emission of the signal H1, making the sought address available in the registers RX, RY and RZ;

at $t = 160$: emission of the signal H2, allowing the the scanning of register CTZ.

As long as the signal N is not obtained at the output of this latter register, there will be a succession of series of signals H1 – H2 spaced at least 40 ns (waiting for N), or about 50 ns.

When the signal N is obtained, another transfer is triggered followed by the emission of the signals H1 and H2. The diagram of FIG. 8 shows an example of times obtained for four recorded events, two events on the same circuit CZ, two others on two different circuits CZ.

The "address" line indicates in bold lines the presence of an effective address code.

The occupied address search may thus be carried out at a frequency of 8 MHz. The emission of the reading signal F may be permanent (as shown in the diagram), the transfer of coordinates being triggered only if the reading order is emitted.

In the case of a negative decision from the central unit 12, the resetting of the flip-flops BA and the effective unblocking of the gate circuits P1 to P512 are carried out in a period of 30 ns.

FIG. 9 shows the diagram of an embodiment example of couples of gate circuits P4000 and P5000 of a circuit CX (or P2000 and P3000 of a circuit CY). Each gate circuit is composed of a NAND logic circuit followed by an inverter.

FIG. 10 likewise represents the diagram of the gate circuits P7000, P8000 and P9000 composed, like the preceding, of NAND circuits followed by an inverter, with the exception of the circuits P8000 which have only a NAND circuit.

In the practical implementation of the basic circuits described, it is naturally advantageous to use the integrated circuits available on the market.

I claim:

1. Logic system for the processing of data derived by detectors, comprising:

a plurality of memory flip-flops each associated with one of said detectors and each having its state modified by the presence of data derived by the associated detector, a first pyramidal-structure, multi-level matrix of OR circuits whose lowest level of OR circuits have inputs connected to the outputs of the memory flip-flops, and whose upper level OR circuits are connected to the outputs of the lower level OR circuits;

a second pyramidal-structure, multi-level matrix of switching circuits, with each level corresponding to a level of the first matrix, and with each switching circuit composed of a series of gate circuit couples interconnected to transmit a scanning signal to the following couple in the absence of an input signal and means to block one of the gate circuits in the presence of an input signal, said input signal representing the propagation through the first matrix of a signal output from one of said flip-flops, means responsive to the blocking of a gate circuit by said blocking means to open a branching channel for said scanning signal towards a lower level switching circuit of said second matrix, and a register and means for causing the storage of information representative of the address of the couple having the blocked gate circuit in said register, the number of switching circuits and the number of OR circuits of the two matrices being identical for corresponding levels, each OR circuit being associated with a switching circuit, the number of gate circuit couples in each switching circuit being equal to the number of inputs of the associated OR circuit, means for connecting the outputs of the OR circuits of a given level to the inputs of the OR circuit of the next higher level and to the inputs of the switching circuits corresponding to the same level to furnish the input signals of the gate circuit couples whose outputs constitute said branching channels for the application of the scanning signal to a lower level switching circuit, said logic system further including:

a plurality of AND gates each connected to the output of a memory flip-flop, said AND gates organized in a number of groups equal to the number of OR gates of the lowest level of the first, matrix and means responsive to a scanning signal coming from a gate circuit couple of the lowest level of the second matrix for causing the AND gates of a given group to conduct, a plurality of OR gates equal in number to the number of OR circuits at the lowest level of the first matrix, and means for connecting the outputs of said AND circuits of each group to the inputs of corresponding ones of said OR gates, and a buffer memory composed of flip-flops each connected to the output of one of the said OR gates, a register, and means for storing the address of a flip-flop undergoing a change of state in said last recited register.

2. Logic system as in claim 1 including delay circuits and means for applying the scanning signal producing the conduction of the AND gates of a group to the reset control of the corresponding memory flip-flops via at least one delay circuit.

3. Logic system as in claim 1 wherein each flip-flop of the buffer memory is associated with:

a first gate circuit which is made conductive by an enabling signal when the flip-flop is in the 1 state and whose output is connected to the address storage register, a second gate circuit which is made conductive through said first circuit for a signal resetting said flip-flop, and a third gate circuit which is made conductive for said enabling signal when the flip-flop is in the 0 state and transmits this signal to the first and third gate circuits associated with the adjacent flip-flop.

4. Logic system as in claim 3 wherein the first and third gate circuits comprise a NAND gate followed by an inverter and the second gate circuit comprises a NAND gate.

5. A logic system for processing data derived from a plurality of individual detectors for the purpose of detecting the presence of data generated by at least one of said detectors and for the purpose of identifying the detectors which have generated data, cogprising:

a plurality of bistable memory elements each receiving as an input the output of one of said detectors and each changing its state and providing an output signal in response to data generated by its associated detector;

a first pyramidal structure multilevel matrix of OR circuits each having a plurality of inputs and one output, with each of the OR circuits of the lowest matrix level receiving as inputs the output signals of a plurality of said bistable elements, and with each of the OR circuits of successively higher matrix levels receiving as inputs the outputs of a plurality of OR circuits of the preceding matrix level, whereby the highest level of the matrix provides an output signal indicating that one or more detectors have generated data;

a second pyramidal structure multilevel matrix of switching circuits, said second matrix having the same number of levels as the first matrix and having within each level the same number of switching circuits as the number of OR circuits in the corresponding level of the first matrix, each switching circuit of the second matrix receiving as inputs the outputs of the OR circuits which are connected to the inputs of the corresponding level OR circuits of the first matrix, and each switching circuit having a number of outputs each connected to an individual one of the lower level switching circuits of the second matrix;

means responsive to the generation of data by a detector and the propagation of the output signal of the bistable element associated therewith through all levels of the first matrix for establishing a branching channel path through each switching circuit of the second matrix which corresponds to an OR circuit of the first matrix through which said output signal has propagated; and an address register and means for storing in the address register an identification of the switching circuits traversed by said branching channel path and the manner of traversal, thereby identifying the bistable elements associated with the detectors generating data and the detectors which have generated data.

6. A logic system as in claim 5 including a plurality of gates interposed between the detectors and the bistable memory elements associated therewith to form triples each comprising a detector, a gate and a bistable element, and including a central decision unit connected to the gates and to the bistable memory elements and responsive to the propagation of an output signal through all levels of the first matrix to close said gates and to reset the bistable memory elements to states in which none of said elements provides said output signal.

7. A logic system as in claim 5 wherein said central decision unit is connected to the address register and is responsive to the storage therein of an address to open said gates.

8. A logic sytem as in claim 7 wherein the address register comprises a plurality of registers equal in number to the levels of the second matrix, and wherein the means for storing in the address register an identification of the switching circuits traversed by said branching channel path comprise a plurality of coding matrices each connected to a switching circuit and each providing as an output a coded identification of the switching circuit through which a branching channel path has been established, and including a plurality of auxiliary gates, each interposed between the output of a coding matrix and a register, and means for enabling the auxiliary gates to transfer into the registers the coded representations provided by the coding matrices in response to the completion of said branching channel path through all levels of the second matrix.

9. A logic system as in claim 8 wherein each of the switching circuits comprises a plurality of gate circuit couples, said gate circuit couples being equal in number to the number of inputs of the switching circuit, with each couple generating an output signal only when receiving an input signal from the corresponding OR circuit of the first matrix and when simultaneouly receiving a switching circuit enabling signal, and including means for causing a reading cycle of the second matrix by providing a switching circuit enabling signal for the highest level switching circuits of the second matrix and by applying to each successively lower level switching circuit of the second matrix the output signal of the next higher level switching circuit through which a branching channel path has been established, said last recited output signal serving as a switching circuit enabling signal.

10. A logic system as in claim 5 including a plurality of gates interposed between the detectors and the bistable memory elements and associated therewith to form triples each comprising a detector, a gate and a bistable element, and including a central decision unit connected to the gates and to the bistable memory elements and responsive to the propagation of an output signal through all levels of the first matrix to close said gates and to reset the bistable elements to states in which none of said elements provides said output signal, and means connecting the central decision unit to the address register for causing the central decision unit to reopen said gates upon the storage in the address register of an identification of the switching circuits traversed by said branching channel path.

11. A logic system as in claim 5 wherein the address register comprises a plurality of registers equal in number to the levels of the second matrix, and wherein the means for storing in the address register an identification of the switching circuits traversed by said branching channel path comprise a plurality of coding matrices each connected to the switching circuit of a level of the second matrix and providing as an output a coded identification of the switching circuit of said level through which a branching channel path has been established, and including a plurality of auxiliary gates, each interposed between the output of a coding matrix and a register, and means for enabling the auxiliary gates to transfer into the registers the coded representations provided by the coding matrices in response to the completion of said branching channel path through all levels of the second matrix.

12. A logic system as in claim 5 wherein each of the switching circuits comprises gate circuits equal in number to the number of inputs of the switching circuit, each of said gate circuits generating an output signal only when receiving an input signal from the corresponding OR circuit of the first matrix and when simultaneously receiving a switching circuit enabling signal, and including means for causing a reading cycle of the second matrix by providing a switching circuit enabling signal for the gate circuits of the highest level switching circuits of the second matrix and by applying to each successively lower level switching circuit of the second matrix the output signal of the next higher level switching circuit through which a branching channel path has been established, said last recited output signal serving as a switching circuit enabling signal for said lower level switching circuits.

* * * * *